(12) United States Patent
Kim (10) Patent No.: US 7,541,754 B2
(45) Date of Patent: Jun. 2, 2009

(54) BIAS CIRCUIT AND METHOD FOR OPERATING THE SAME

(75) Inventor: U Hyun Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 11/192,105

(22) Filed: Jul. 29, 2005

(65) Prior Publication Data

US 2006/0132067 A1 Jun. 22, 2006

(30) Foreign Application Priority Data

Dec. 17, 2004 (KR) ...................... 10-2004-0107843
Dec. 17, 2004 (KR) ...................... 10-2004-0107844

(51) Int. Cl.
*G09G 1/04* (2006.01)
*G09G 1/28* (2006.01)
(52) U.S. Cl. .................................. 315/364; 315/368.21
(58) Field of Classification Search ............. 315/169.3, 315/169.4, 209 R, 291, 173–175, 187–188, 315/368.18, 368.21, 368.22, 364, 365
See application file for complete search history.

(56) References Cited

U.S. PATENT DOCUMENTS 5,283,505 A * 2/1994 Bando ........................ 315/411
5,955,848 A * 9/1999 Arima et al. ................. 315/371
6,222,330 B1 * 4/2001 Suzuki ........................ 315/408
6,225,763 B1 * 5/2001 Kang .......................... 315/370
6,259,425 B1 * 7/2001 Shimizu ...................... 345/94
6,469,916 B1 * 10/2002 Kerkman et al. .............. 363/41
6,486,618 B1 * 11/2002 Li .............................. 315/291

FOREIGN PATENT DOCUMENTS

KR 1998-042371 8/1998

OTHER PUBLICATIONS

Korean Office Action dated May 29, 2006.

* cited by examiner

*Primary Examiner*—Douglas W. Owens
*Assistant Examiner*—Minh Dieu A
(74) *Attorney, Agent, or Firm*—Ked & Associates LLP (57) ABSTRACT

A bias circuit and a method for operating the same minimizes a picture distortion. The bias circuit includes a main capacitor and a plurality of sub capacitors for compensating picture distortion, a controller provides control signals having different duty cycles, and a plurality of switches receiving each of the switch control signals and changing each link (or path) between the main capacitor and the sub capacitors in accordance with the received switch control signals.

28 Claims, 11 Drawing Sheets

FIG. 10

BIAS CIRCUIT AND METHOD FOR OPERATING THE SAME

This application claims the benefit of the Korean Patent Application No. 10-2004-00107843, filed on Dec. 17, 2004, and No. 10-2004-00107844, filed on Dec. 17, 2004, which are incorporated herein by reference.

BACKGROUND OF THE INVENTION

1. Field of the Invention

The present invention relates to a display device, and more particularly, to a bias circuit and a method for operating the same for a display device, e.g., cathode ray tube (CRT) and preferably, an ultra slim display device.

2. Background of the Related Art

A cathode ray tube (CRT) of a display device focuses and accelerates electrons discharged from an R/G/B electron gun, which collide with an R/G/B phosphor screen through a shadow mask to form pixels. An electrical current flows through vertical and horizontal bias coils to create a 2-dimensional screen. However, a picture distortion may occur caused by a difference in the distance between the electron gun and a center portion of the CRT screen and the difference in distance between the electron gun and corner portions of the CRT screen. In other words, since the distance between the electron gun and the corner portions of the CRT screen is relatively long, a cross-hatch width on the screen may not be uniform, and the resolution (or definition) at the corner portions of the screen may be lower than the resolution (or definition) at the center portion of the screen.

Further, due to the above-described difference in distance, a pin distortion may occur at the corner portions of the screen. As the distance between the electron gun and the CRT screen becomes smaller, the above-described picture distortion may worsen. Hence, there are many difficulties including ones described above for reducing the distance between the electron gun and the CRT screen and difficulties in producing an ultra-slim display device especially, an ultra-slim CRT display device.

SUMMARY OF THE INVENTION

An object of the invention is to solve at least the above problems and/or disadvantages and to provide at least the advantages described hereinafter.

An object of the present invention is to minimize and/or prevent picture distortion.

Another object is to prevent pin distortion. Another object of the invention is to compensate for the difference in distance between an electron gun and a display screen.

A further object of the invention is to provide a bia circuit and method thereof for an ultra-slim CRT display device.

To achieve these objects and other advantages and in accordance with the purpose of the invention, as embodied and broadly described herein, a bias circuit includes a main capacitor and a plurality of sub capacitors for compensating picture distortion, a switch controller responding to a horizontal synchronizing signal and outputting switch control signals having different duty cycles, and a plurality of switches receiving each of the switch control signals and changing each link between the main capacitor and the sub capacitors in accordance with the received switch control signals.

The switch controller receives a saw-tooth wave signal being synchronized with the horizontal synchronizing signal and a parabolic signal being synchronized with a vertical synchronizing signal, and wherein the switch controller includes a plurality of comparators outputting each of the switch control signals in accordance with a comparison result of the two signals, where each of the switch control signals having a different duty cycle.

The switch controller further comprises a transformer transforming a voltage size of the horizontal synchronizing signal; and a saw-tooth wave signal generator modifying the signal outputted from the transformer to the saw-tooth wave signal.

The switch controller further comprises a plurality of resists for applying DC voltages each having a different voltage level to the parabolic signal that is applied to each of the comparators.

Each of the switches connects in parallel corresponding sub capacitors when the switches are turned on, and wherein each of the switches connects in parallel the sub capacitors that are connected to one another in parallel to the main capacitor.

In another aspect of the present invention, a bias circuit includes a main capacitor for compensating distortion occurring on an entire picture, a plurality of sub capacitors for compensating distortion occurring in specific regions of a picture, a plurality of comparators outputting switch control signals each having a different pulse width in accordance with parabolic signals having DC voltages of different voltage levels and a saw-tooth wave signal, and a plurality of switches receiving each of the switch control signals and changing each link between the main capacitor and the sub capacitors in accordance with the received switch control signals.

Each of the comparator may output the switch control signals each having a different pulse width in accordance with a voltage level of the DC voltage that is applied to the parabolic signals. Herein, the comparator may generate a switch control signal having a large pulse width when the voltage level of the DC voltage is high, and the comparator may generate a switch control signal having a small pulse width when the voltage level of the DC voltage is low.

A saw-tooth wave signal generator generates the saw-tooth wave signal, which is synchronized with a horizontal synchronizing signal. A photo-coupler receives the parabolic signal, which is synchronized with a vertical synchronizing signal; and a plurality of resistors applies DC voltages, each DC voltage having a different voltage level to the parabolic signal that is received through the photo-coupler.

Each of the switches connects in parallel corresponding sub capacitors when the switches are turned on, and wherein each of the switches connects in parallel the corresponding sub capacitors that are connected to one another in parallel to the main capacitor. An added capacitance value of the main capacitor and the corresponding sub capacitors is a maximum value, when the switches are turned off.

Each of the comparator outputs the switch control signals each having a different pulse width in accordance with a voltage level of the DC voltage that is applied to the parabolic signals. The comparator generates a switch control signal having a large pulse width when the voltage level of the DC voltage is high, and wherein the comparator generates a switch control signal having a small pulse width when the voltage level of the DC voltage is low.

In another aspect of the present invention, a bias circuit includes a main capacitor for compensating distortion occurring on an entire picture, a plurality of sub capacitors for compensating distortion occurring in specific regions of a picture, a plurality of comparators outputting switch control signals each having a different pulse width in accordance with a first parabolic signal synchronized with a horizontal synchronizing signal and second parabolic signals having DC voltages of different voltage levels, and a plurality of switching units receiving each of the switch control signals and changing each link between the main capacitor and the sub capacitors in accordance with the received switch control signals.

The switching unit may include a first switch operating in accordance with the switch control signal outputted from the switch controller, a transformer outputting a pulse signal in accordance with the control of the first switch, and a second switch changing a link between the main capacitor and corresponding sub capacitors in accordance with the pulse signal outputted from the transformer.

In another aspect of the present invention, a method for driving a bias circuit includes generating a saw-tooth wave signal that is synchronized with the horizontal synchronizing signal, generating parabolic signals each having a DC voltage of a different voltage level applied thereto, outputting the switch control signals each having a different pulse width in accordance with the saw-tooth wave signal and the parabolic signals, and changing each link between a main capacitor and a plurality of sub capacitors, the main capacitor compensating distortion occurring on an entire picture and the sub capacitors compensating distortion occurring in specific regions of a picture.

Herein, the outputting the switch control signals each having a different pulse width may include outputting the switch control signals each having a different pulse width in accordance with the voltage level of the DC voltages being applied to the parabolic signals. And, the changing each link between a main capacitor and a plurality of sub capacitors may include, when the outputted switch control signal is at a high level, connecting in parallel the corresponding sub capacitors, and connecting in parallel the sub capacitors that are connected in parallel to the main capacitor.

A switch control signal having a large pulse width is outputted when the voltage level of the DC voltage is high, and wherein a switch control signal having a small pulse width is outputted when the voltage level of the DC voltage is low.

The changing of each link between a main capacitor and a plurality of sub capacitors comprises when the outputted switch control signal is at a low level, connecting in series the corresponding sub capacitors, and connecting in parallel the sub capacitors that are connected in series to the main capacitor.

In a further aspect of the present invention, a method for driving a bias circuit includes generating a first parabolic signal that is synchronized with the horizontal synchronizing signal, generating second parabolic signals each having a DC voltage of a different voltage level applied thereto, outputting the switch control signals each having a different pulse width in accordance with the first and second parabolic signals, and adjusting an added capacitance value of a main capacitor and a plurality of sub capacitors in accordance with the switch control signals, the main capacitor compensating distortion occurring on an entire picture and the sub capacitors compensating distortion occurring in specific regions of a picture.

The present invention can be achieved in a whole or in parts by a method of driving a bias circuit, comprising responding to a horizontal synchronizing signal and generating switch control signals each having a different duty cycle; transmitting the switch control signal to a plurality of switches; and changing each link between a main capacitor and a plurality of sub capacitors, which are all connected to each switch, in accordance with the transmitted switch control signals.

The generating switch control signals each having a different duty cycle are generated based on generating a saw-tooth wave signal that is synchronized with the horizontal synchronizing signal; generating parabolic signals each having a DC voltage of a different voltage level applied thereto; and generating the switch control signals each having a different duty cycle in accordance with the saw-tooth wave signal and the parabolic signals.

The changing each link between a main capacitor and a plurality of sub capacitors comprises when the switch control signal being transmitted to the switch is at a high level, connecting in parallel the corresponding sub capacitors, and connecting in parallel the sub capacitors that are connected in parallel to the main capacitor.

The step of changing each link between a main capacitor and a plurality of sub capacitors comprises: when the switch control signal being transmitted to the switch is at a low level, connecting in series the corresponding sub capacitors, and connecting in parallel the sub capacitors that are connected in series to the main capacitor.

The present invention can be achieved in a whole or in parts by a main capacitor and a plurality of sub capacitors for compensating picture distortion; a switch controller responding to a horizontal synchronizing signal and outputting switch control signals having different duty cycles; and a plurality of switching units receiving each of the switch control signals and adjusting an added capacitance value of the main capacitor and the sub capacitors in accordance with the received switch control signals.

The switch controller comprises a plurality of comparators each receiving a first parabolic signal that is synchronized with the horizontal synchronizing signal and a second parabolic signal that is synchronized with a vertical synchronizing signal, and outputting switch control signals each having a different duty cycle depending upon a comparison result between the first and second parabolic signals.

The switch controller further comprises a plurality of resists for adjusting voltage levels of DC voltages that are applied to the second parabolic signals. Each of the switching units connects in parallel corresponding sub capacitors when the switches are turned on, and wherein each of the switching units connects in parallel the sub capacitors that are connected to one another in parallel to the main capacitor.

The switching unit comprises a first switch operating in accordance with the switch control signal outputted from the switch controller; a transformer outputting a pulse signal in accordance with the control of the first switch; and a second switch changing a link between the main capacitor and the sub capacitors in accordance with the pulse signal outputted from the transformer.

The present invention can also be achieved in a whole or in parts by a bias circuit, comprising a main capacitor for compensating distortion occurring on an entire picture; a plurality of sub capacitors for compensating distortion occurring in specific regions of a picture; a plurality of comparators outputting switch control signals each having a different pulse width in accordance with a first parabolic signal synchronized with a horizontal synchronizing signal and second parabolic signals having DC voltages of different voltage levels; and a plurality of switching units receiving each of the switch control signals and changing each link between the main capacitor and the sub capacitors in accordance with the received switch control signals.

The switch controller further comprises a plurality of resists for adjusting voltage levels of DC voltages that are applied to the second parabolic signals.

The switching unit comprises a first switch operating in accordance with the switch control signal outputted from the switch controller; a transformer outputting a pulse signal in accordance with the control of the first switch; and a second switch changing a link between the main capacitor and corresponding sub capacitors in accordance with the pulse signal outputted from the transformer.

The second switch connects in parallel the main capacitor and the corresponding sub capacitors, when the second switch is turned on. An added capacitance value of the main capacitor and the sub capacitors is a maximum value, when the second switch is turned off.

Each of the comparator outputs the switch control signals each having a different pulse width in accordance with a voltage level of the DC voltage that is applied to the second parabolic signals. The comparator generates a switch control signal having a large pulse width when the voltage level of the DC voltage is high, and wherein the comparator generates a switch control signal having a small pulse width when the voltage level of the DC voltage is low.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

A method for driving a bias circuit, comprising generating a first parabolic signal that is synchronized with the horizontal synchronizing signal; generating second parabolic signals each having a DC voltage of a different voltage level applied thereto; outputting the switch control signals each having a different pulse width in accordance with the first and second parabolic signals; and adjusting an added capacitance value of a main capacitor and a plurality of sub capacitors in accordance with the switch control signals, the main capacitor compensating distortion occurring on an entire picture and the sub capacitors compensating distortion occurring in specific regions of a picture.

The outputting the switch control signals each having a different pulse width comprises outputting the switch control signals each having a different pulse width in accordance with the voltage level of the DC voltages being applied to the second parabolic signals.

A switch control signal having a large pulse width is outputted when the voltage level of the DC voltage is high, and wherein a switch control signal having a small pulse width is outputted when the voltage level of the DC voltage is low.

The adjusting an added capacitance value of a main capacitor and a plurality of sub capacitors comprises when the outputted switch control signal is at a low level, increasing the added capacitance value of the main capacitor and the corresponding sub capacitors.

The adjusting an added capacitance value of a main capacitor and a plurality of sub capacitors comprises when the outputted switch control signal is at a high level, reducing the added capacitance value of the main capacitor and the corresponding sub capacitors.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

First Embodiment

Figure 1:
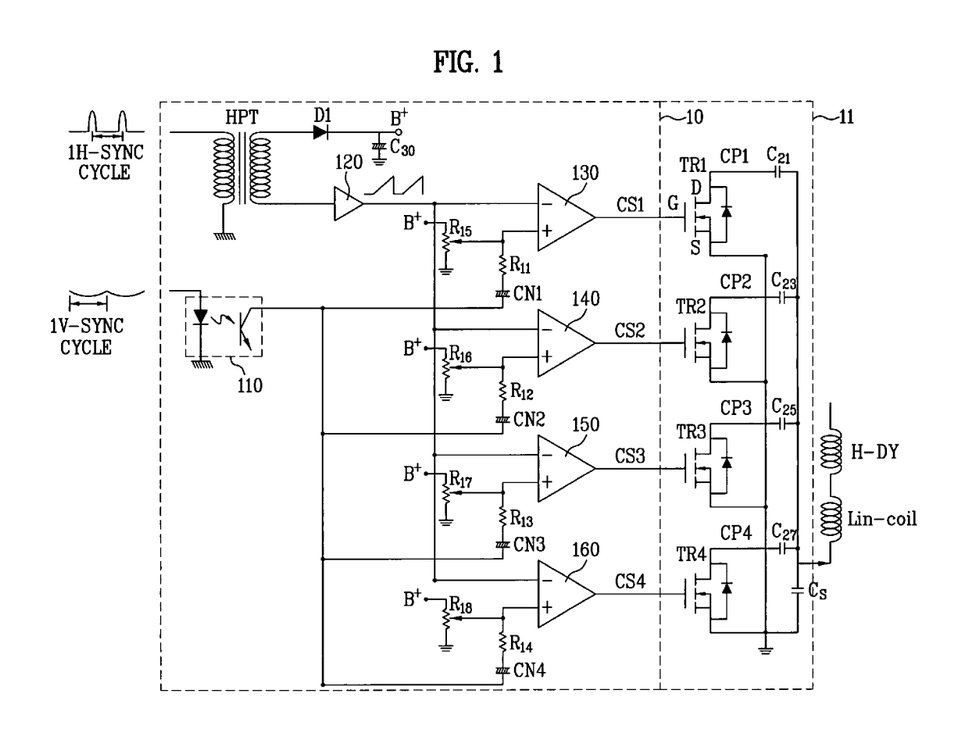
FIG. 1 illustrates a bias circuit according to a first embodiment of the present invention.

FIG. 1 illustrates a bias circuit according to a first embodiment of the present invention. The bias circuit includes a switch controller 10 and a compensation circuit 11. The switch controller 10 receives a horizontal synchronizing signal (H-SYNC) and a parabolic voltage, where the parabolic voltage is synchronized with a vertical synchronizing signal (V-SYNC), and outputting a plurality of switch control signals CS1-CS4, each having a different duty cycle: A duty cycle refers to a ratio between 'on' time(s) and 'off' time(s). The switch controller 10 includes a horizontal pulse transformer (HPT), a saw-tooth wave generator 120, a photo-coupler 110, and a plurality of comparators 130, 140, 150, and 160.

The horizontal pulse transformer (HPT) receives the horizontal synchronizing signal (H-SYNC) and then combines, preferably, the voltage size of the received horizontal synchronizing signal (H-SYNC) with a DC voltage and outputs the combined voltage. The saw-tooth wave generator 120 receives the signal outputted from the horizontal pulse transformer (HPT) and transforms the received signal to a saw-tooth wave type signal. The cycle (frequency) of the saw-tooth wave signal is identical to the cycle (frequency) of the horizontal synchronizing signal (H-SYNC).

A light-emitting diode of the photo-coupler 110 receives the parabolic signal. The photo-coupler 110 converts the received parabolic signal to an optical signal and outputs the converted signal. A photo-transistor of the photo-coupler 110 receives the optical signal from the light-emitting diode and restores the received optical signal to an electrical signal. The photo-coupler 110 is preferably used as an electrical insulation between the inputs and outputs. The signal received at the photo-transistor of the photo-coupler 110 passes through a plurality of condensers (or capacitors) CN1, CN2, CN3, and CN4 and a plurality of resisters R11, R12, R13, and R14 for input to a '+' terminal of each comparators 130, 140, 150, and 160.

Figure 2:
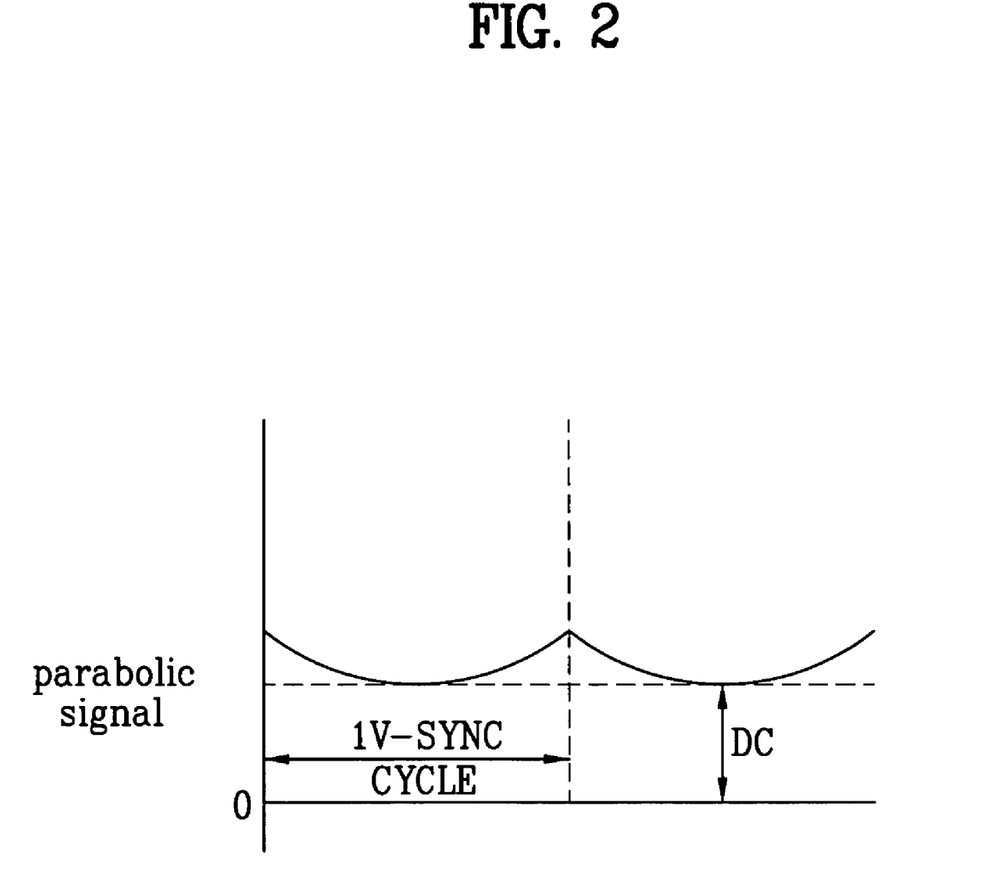
FIG. 2 illustrates an example of a parabolic signal having DC voltage applied thereto.

FIG. 2 illustrates an example of a parabolic signal having DC voltage applied thereto. The level of the parabolic signal having the DC voltage applied thereto varies in accordance with the level of the DC voltage B+. The pulse outputted from the horizontal pulse transformer (HPT) is rectified by a diode (D1) and a capacitor (C30) to provide the DC voltage B+. A plurality of variable resistors R15, R16, R17, and R18 receives the DC voltage, and different levels of DC voltages are respectively applied to the parabolic signals inputted to the "+" terminals of the comparators 130, 140, 150, and 160.

For example, the variable resistor R15 applies the highest DC voltage level (or a first level DC voltage) to the parabolic signal that is inputted to the comparator 130. The variable resistor R16 applies a second highest DC voltage level (or a second level DC voltage) to the parabolic signal that is inputted to the comparator 140. The variable resistor R17 applies a third level DC voltage to the parabolic signal that is inputted to the comparator 150. The variable resist R18 applied a fourth level DC voltage to the parabolic signal that is inputted to the comparator 160.

Figure 3:
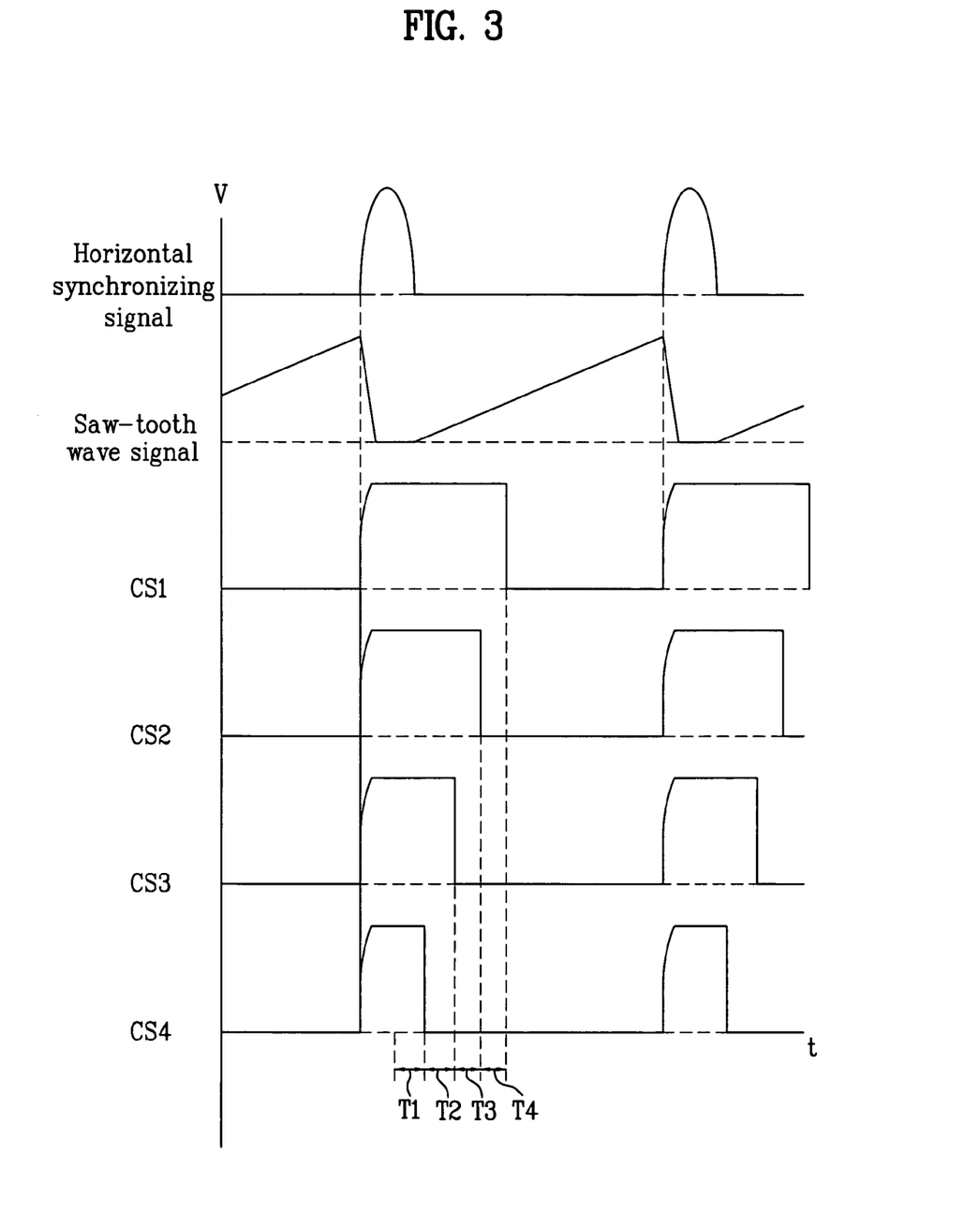
FIG. 3 illustrates switch control signals outputted from comparators.

The comparators 130, 140, 150, and 160 each receives the saw-tooth wave signal through a '−' terminal and, each receives a parabolic signal having a different DC voltage level applied thereto through a '+' terminal. Subsequently, the comparators 130, 140, 150, and 160 compare each of the received saw-tooth wave signal with the parabolic signals, thereby respectively outputting pulse type switch control signals CS1, CS2, CS3, and CS4 based upon the two signals, as shown in FIG. 3.

The pulse width of the switch control signals CS1, CS2, CS3, and CS4 varies in accordance with the level of the DC voltages applied to the parabolic signals, respectively. For example, when the voltage level of the DC voltage that is applied to the parabolic signal, which is inputted to the comparator 130, is the highest level, the comparator 130 outputs the switch control signal CS1 having the largest pulse width. When the voltage level of the DC voltage that is applied to the parabolic signal, which is inputted to the comparator 160, is the lowest level, the comparator 160 outputs the switch control signal CS4 having the smallest pulse width.

Since the DC voltage levels inputted to the comparators 130, 140, 150, and 160 are different from one another, the pulse width of each of the switch control signals CS1, CS2, CS3, and CS4 is also different from one another. The switch control signals CS1, CS2, CS3, and CS4 outputted from the comparators 130, 140, 150, and 160 are respectively to the gates of a plurality of switches TR1, TR2, TR3, and TR4.

The switches TR1, TR2, TR3, and TR4 are field effect transistors, e.g., p-type or n-type and preferably n-type. The switches TR1, TR2, TR3, and TR4 are connected to a main compensation capacitors (or S-capacitor) Cs and a plurality of sub (or auxiliary) compensation capacitors C21, C23, C25, and C27, respectively. The main compensation capacitor Cs compensates the distortion of an entire picture, and each of the sub compensation capacitors C21, C23, C25, or C27 compensates the distortion occurring in specific regions of the picture. For example, the switch TR1 is connected to the sub compensation capacitor C21 through a drain, and the sub compensation capacitor C21 is connected in parallel to the main compensation capacitor Cs. The switch TR2 is connected to the sub compensation capacitor C23 through the drain, and the switch TR3 is connected to the sub compensation capacitor C25 through the drain. The switch TR4 is connected to the sub compensation capacitor C27 through the drain. Each of the sub compensation capacitors C23, C25, and C27 is connected in parallel to the main compensation capacitor Cs.

Figure 4A:
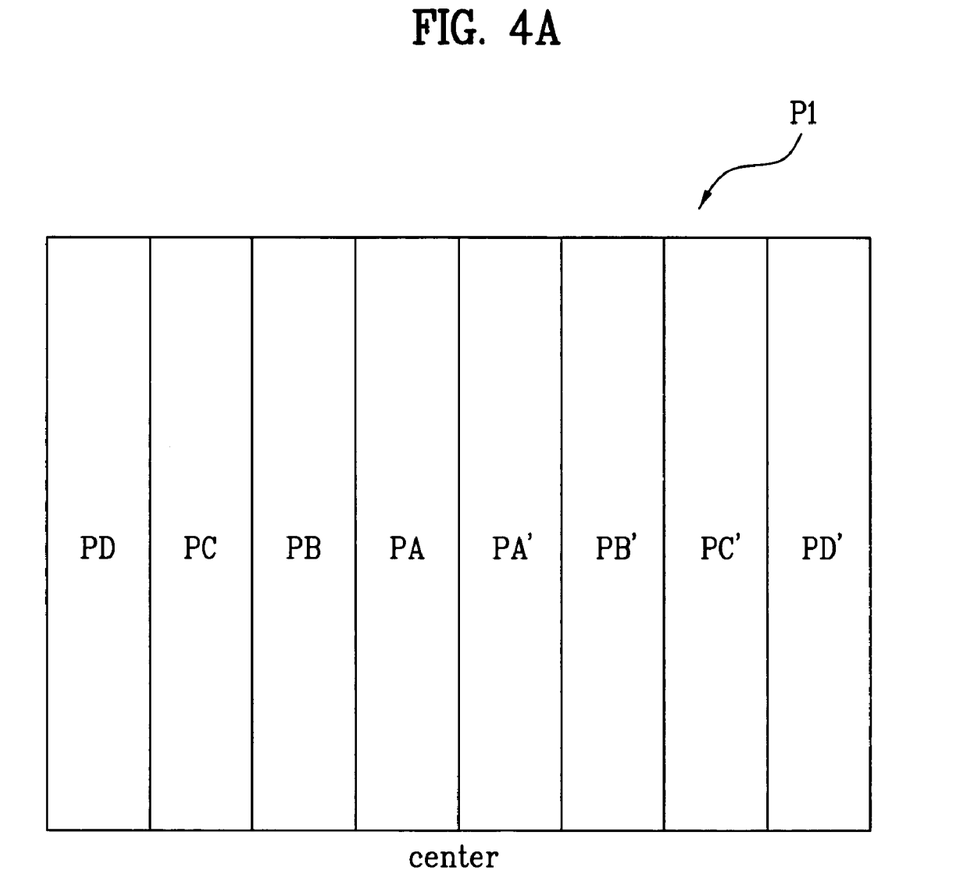
FIG. 4A illustrates portions of pictures compensated by a bias circuit.

In the present invention, the sub compensation capacitors are used to prevent distortion from occurring in specific regions of the picture P1 as shown in FIG. 4A. For example, the sub compensation capacitor C21 compensates the distortion occurring in the center left and right regions (PA, PA') of the picture along with the main compensation capacitor Cs. The sub compensation capacitor C23 compensates the distortion occurring in the subsequent center left and right portions (PB, PB') of the picture, and the sub compensation capacitor C25 compensates distortion occurring in the second subsequent center left and right portions (PC, PC') of the picture. Finally, the sub compensation capacitor C27 compensates distortion occurring in the left and right edge portions (PD, PD') of the picture.

Figure 4B:
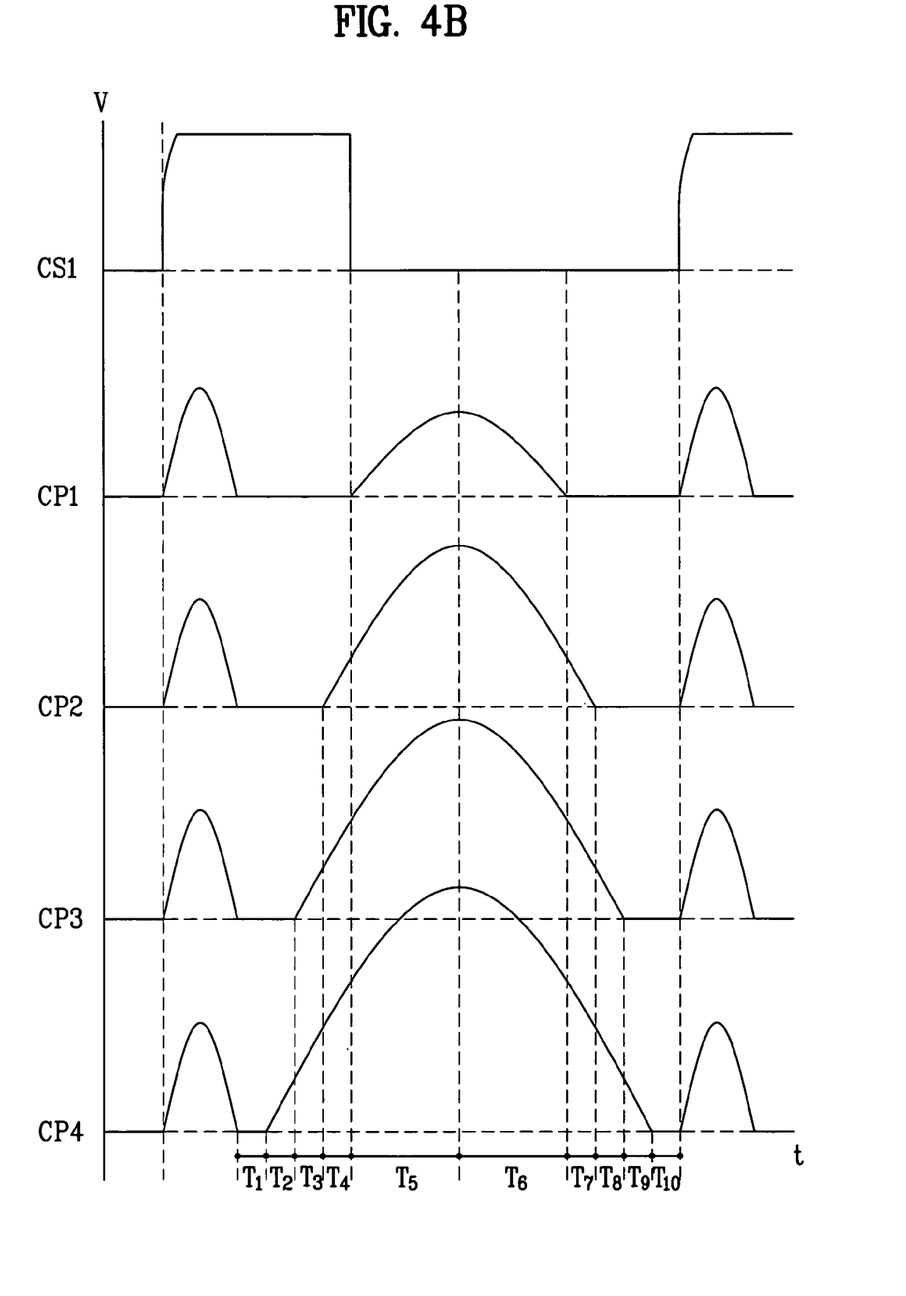
FIG. 4B illustrates signals detected from contact points (CP1, CP2, CP3, and CP4)

FIG. 4B illustrates signals detected from output terminals or nodes CP1, CP2, CP3, and CP4 of the switches TR1, TR2, TR3, and TR4. When the level of the switch control signal CS1 is high, the switch TR1 is turned on. At this point, the sub compensation capacitor C21 is connected in parallel to the main compensation capacitor Cs, and the electric potential of the output terminal CP1 is minimized in sections or time period T1 to T4. In section or time period T5, since the level of the switch control signal CS1 is low, the switch TR1 is turned off. Thus, the electric potential of the output terminal CP1 increases.

Starting from section or time period T6, the electric potential of the output terminal CP1 decreases. Starting from section or time period T7, since the discharge potential of the main compensation capacitor Cs is lower than the charge potential of the sub compensation capacitor C21, the diode connected to the switch TR1 is turned on. In sections or time periods T7 to T11, the sub compensation capacitor C21 is connected in parallel to the main compensation capacitor, thereby minimizing the electrical potential of the output terminal CP1 once again.

In sections or time periods T1 to T3, since the level of the switch control signal CS2 is high, the switch TR2 is turned on, and the sub compensation capacitor C23 is connected in parallel to the main compensation capacitor Cs. At this point, the electric potential of the output terminal CP2 is at the minimum level. In sections or time periods T4 to T5, the level of the switch control signal CS2 is low, and therefore, the switch TR2 is turned off, and the electric potential of the output terminal CP2 increases.

Starting from section or time periods T6, the electric potential of the output terminal CP2 begins to decrease, and starting from section or time periods T8, the discharge potential of the main compensation capacitor Cs becomes lower than the charge potential of the sub compensation capacitor C23. Accordingly, the diode connected to the switch TR2 is turned on, and the sub compensation capacitor C23 is connected in parallel to the main compensation capacitor Cs between sections or time periods T8 and T10.

In sections or time periods T1 to T2, since the level of the switch control signal CS3 is high, the switch TR3 is turned on, and the sub compensation capacitor C25 is connected in parallel to the main compensation capacitor Cs. In sections or time periods T3 to T5, the level of the switch control signal CS3 is low, and therefore, the switch TR3 is turned off, and the electric potential of the output terminal CP3 increases.

Starting from section or time period T6, the electric potential of the output terminal CP3 begins to decrease, and starting from section or time period T9, the discharge potential of the main compensation capacitor Cs becomes lower than the charge potential of the sub compensation capacitor C25. Accordingly, the diode connected to the switch TR3 is turned on, and the sub compensation capacitor C25 is connected in parallel to the main compensation capacitor Cs between sections or time periods T9 and T10.

In section or time period T1, since the level of the switch control signal CS4 is high, the switch TR4 is turned on, and the sub compensation capacitor C27 is connected in parallel to the main compensation capacitor Cs. In sections or timer periods T2 to T5, the level of the switch control signal CS4 is low, and therefore, the switch TR4 is turned off, and the electric potential of the output terminal CP4 increases. Starting from section or time period T6, the electric potential of the output terminal CP4 begins to decrease, and starting from section or time period T10, the discharge potential of the main compensation capacitor Cs becomes lower than the charge potential of the sub compensation capacitor C27. Accordingly, the diode connected to the switch TR4 is turned on, and the sub compensation capacitor C27 is connected in parallel to the main compensation capacitor Cs.

Furthermore, in section or time period T1, when all of the switches TR1, TR2, TR3, and TR4 are turned on, the sub compensation capacitors C21, C23, C25, and C27 are connected to one another in parallel, and each of the sub compensation capacitors C21, C23, C25, and C27 is then connected in parallel to the main compensation capacitor Cs. In sections or time periods T5 to T6, when all of the switches TR1, TR2, TR3, and TR4 are turned off, the sub compensation capacitors C21, C23, C25, and C27 are not connected to one another in parallel, and the sub compensation capacitors C21, C23, C25, and C27 are not connected in parallel to the main compensation capacitor Cs.

Figure 5:
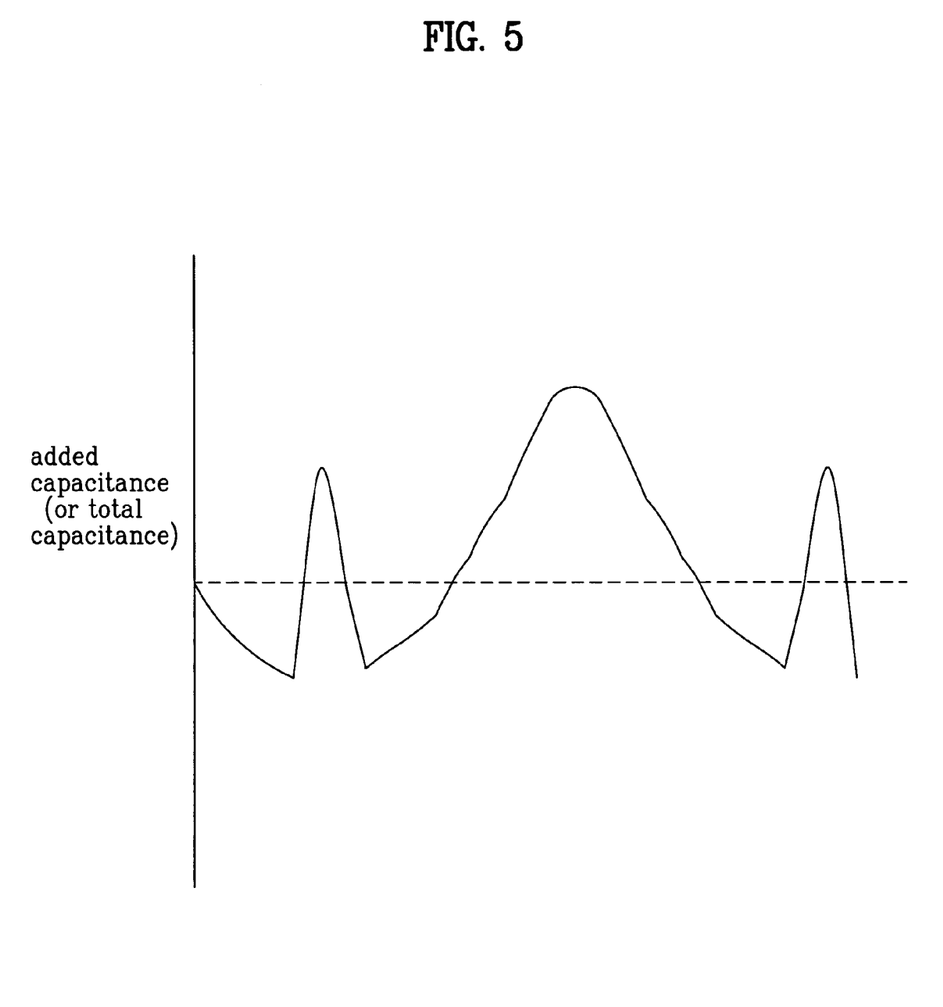
FIG. 5 illustrates an integrated wave form of the signals shown in FIG. 4B.

FIG. 5 illustrates an integrated wave form of the signals outputted from the output terminals CP1, CP2, CP3, and CP4, as shown in FIG. 4. The signals shown in FIG. 5 are applied to an anode of the cathode ray tube (CRT), thereby compensating or preventing the picture distortions that occur on the picture.

Second Embodiment

Figure 6:
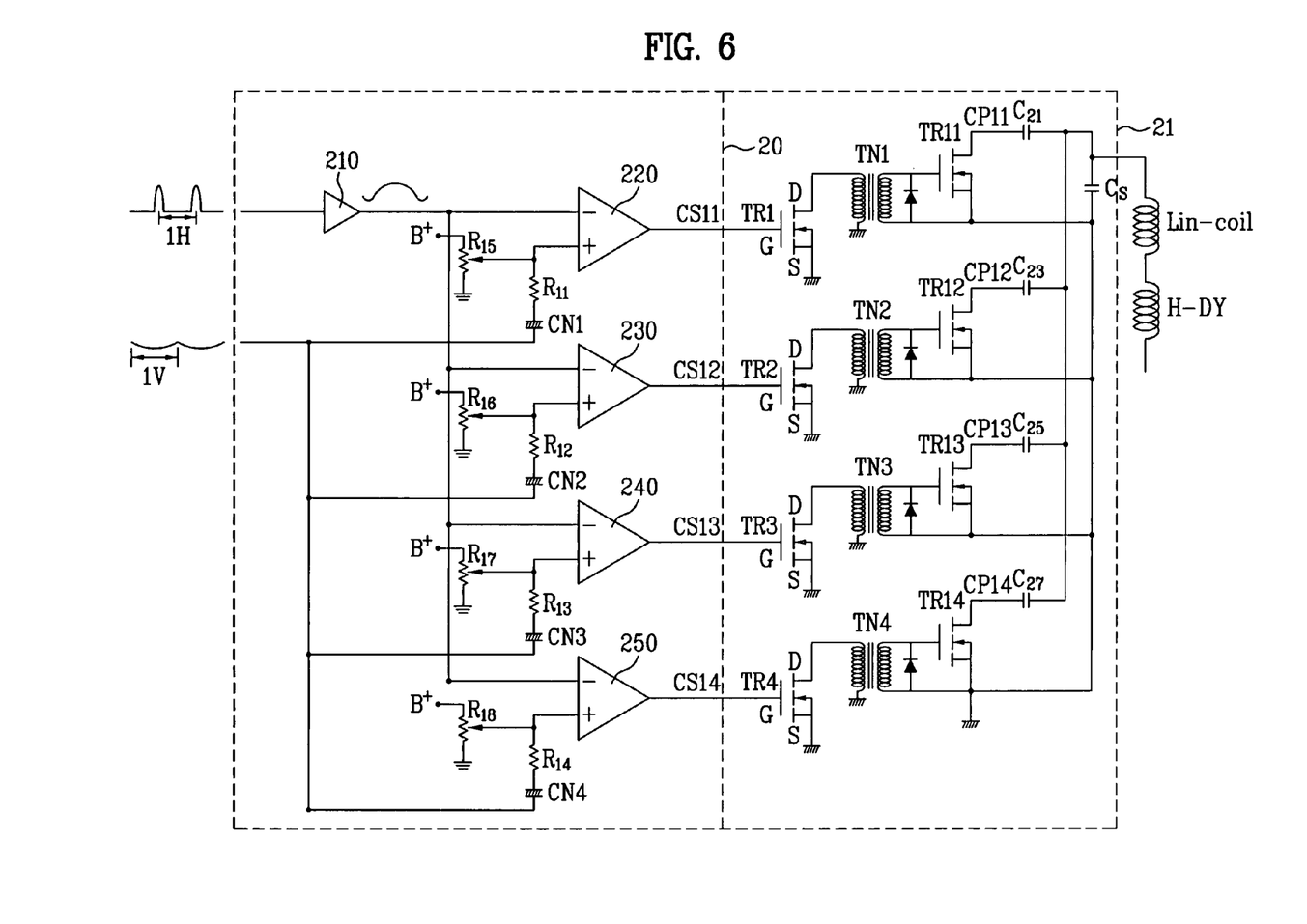
FIG. 6 illustrates a bias circuit according to another embodiment of the present invention.

FIG. 6 illustrates another example of a bias circuit according to the present invention. The bias circuit includes a switch controller 20 and a compensation circuit 21 (or a plurality of switching units). The switch controller 20 receives a horizontal synchronizing signal (H-SYNC) and a parabolic voltage. Thereafter, the switch controller 20 outputs a plurality of switch control signals each having a different duty cycle. A duty cycle refers to a ratio between repeated 'on' time(s) and 'off' time(s). The switch controller 20 includes a parabolic signal generator 210, a plurality of variable resistors R15, R16, R17, and R18, and a plurality of comparators 220, 230, 240, and 250.

The parabolic signal generator 210 generates a first parabolic signal that is synchronized with the horizontal synchronizing signal (H-SYNC). The first parabolic signal generated from the parabolic signal generator 210 is inputted to a '−' terminal of each comparator 220, 230, 240, and 250. A second parabolic signal that is synchronized with a vertical synchronizing signal (V-SYNC) passes through a plurality of condensers or capacitors CN1, CN2, CN3, and CN4 and a plurality of resistors R11, R12, R13, and R14. DC voltages of different voltage levels are applied to the second parabolic signal by the variable resistors RI5, R16, R17, and R18.

Figure 7:
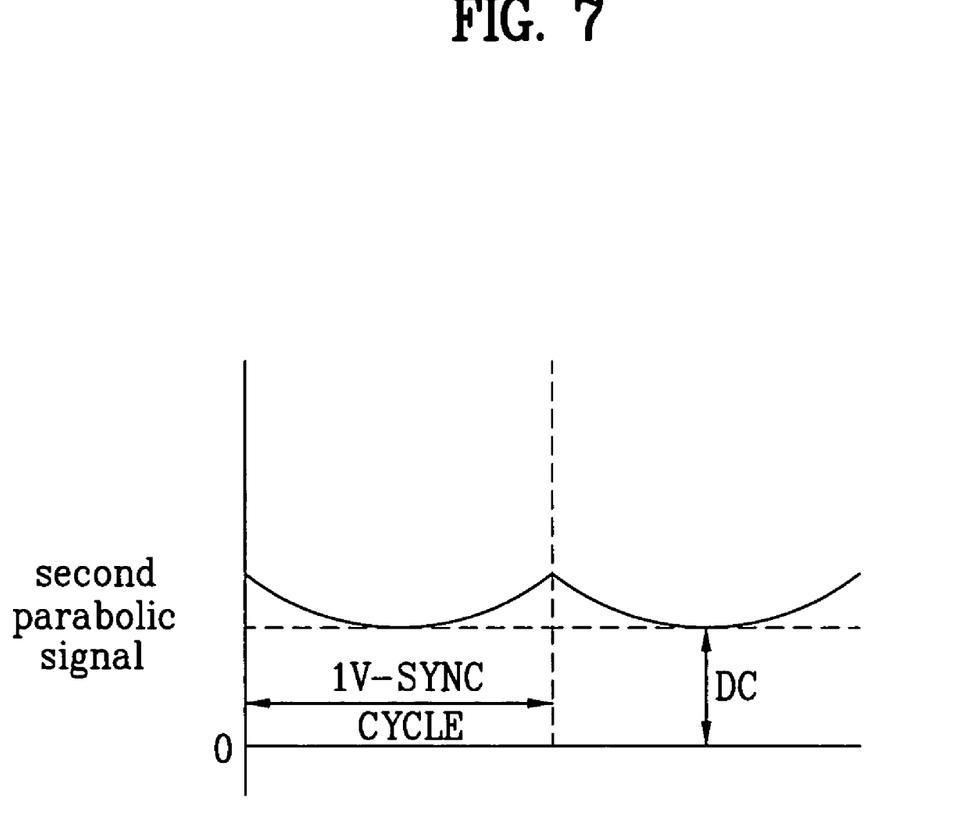
FIG. 7 illustrates another example of a parabolic signal having DC voltage applied thereto.

FIG. 7 illustrates a second parabolic signal having a DC voltage applied thereto. The voltage level of the second parabolic signal having the DC voltage applied thereto may vary in accordance with the DC voltage level. The DC voltage is a voltage (B+) supplied from a power circuit or a voltage source of a television receiver or a display device or a rectifying circuit similar to FIG. 1. Each of the variable resistors R15, R16, R17, and R18 receives the DC voltage and applies the DC voltages, each having a different voltage level, to the second parabolic signal, which is inputted to each of the comparators 220, 230, 240, and 250, respectively.

For example, the variable resistor R15 receives a DC voltage from the voltage (B+). Thereafter, the highest DC voltage level (or first level DC voltage) is applied to the second parabolic signal inputted to the comparator 220. The variable resistor R16 receives a DC voltage from the voltage (B+), and then a second highest DC voltage level (or second level DC voltage) is applied to the second parabolic signal inputted to the comparator 230. Subsequently, the variable resistor R17 receives a DC voltage from the voltage (B+), and a third level DC voltage is applied to the second parabolic signal inputted to the comparator 240. Finally, the variable resistor R18 applies a fourth level DC voltage to the second parabolic signal being inputted to the comparator 250.

The comparators 220, 230, 240, and 250 each receives the first parabolic signal through a '−' terminal and, each receives a second parabolic signal having a different DC voltage level applied thereto through a '+' terminal. Each of the comparators 220, 230, 240, and 250 compares each of the received first parabolic signal with the second parabolic signals and outputs pulse type switch control signals CS11, CS12, CS13, and CS14 based upon the two signals.

Figure 8:
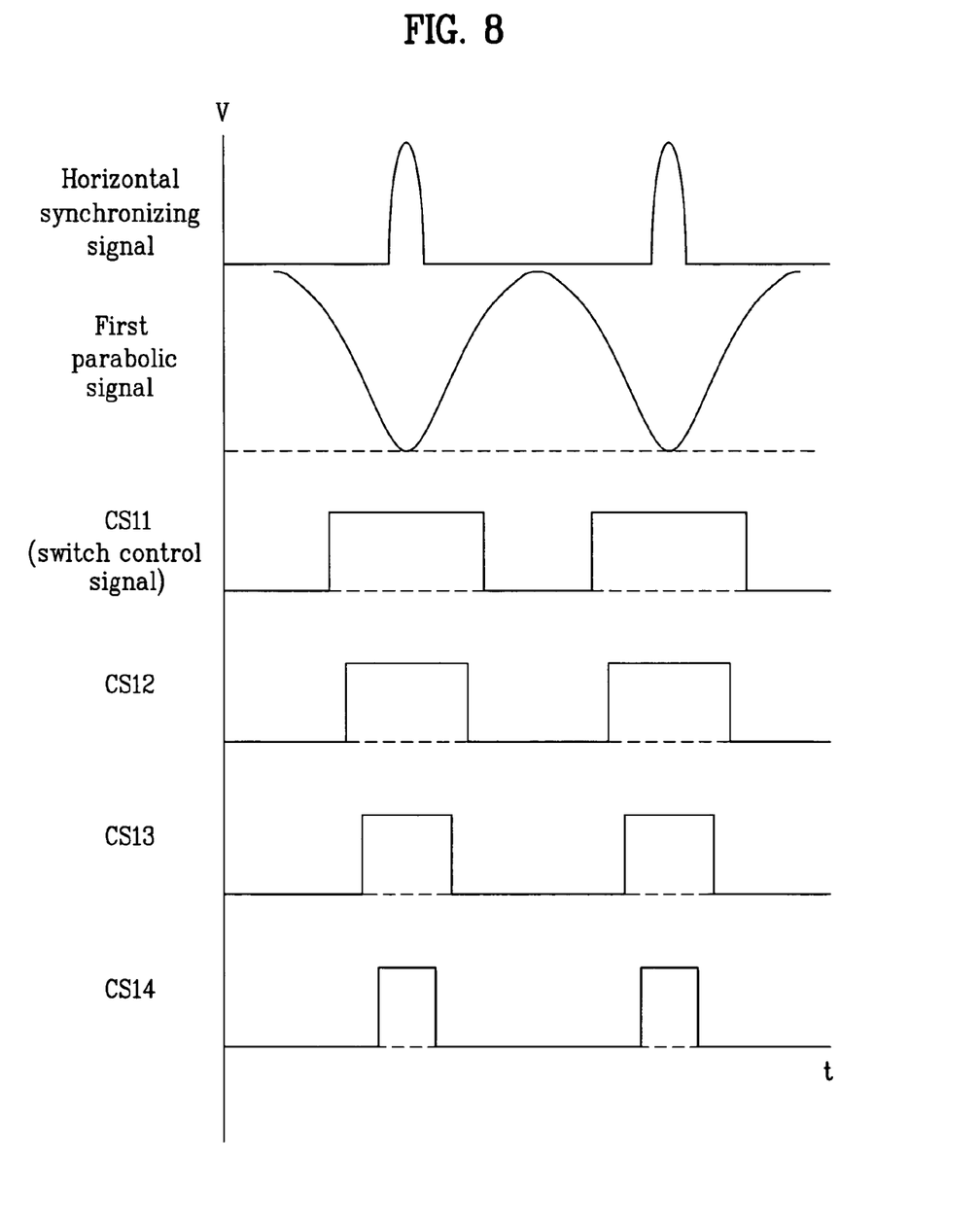
FIG. 8 illustrates switch control signals outputted from comparators.

Referring to FIG. 8, the pulse width of the switch control signals CS11, CS12, CS13, and CS14 varies in accordance with the level of the DC voltages applied to the second parabolic signals, respectively. For example, when the voltage level of the DC voltage that is applied to the second parabolic signal, which is inputted to the comparator 220, is the highest level, the comparator 220 outputs the switch control signal CS11 having the largest pulse width. When the voltage level of the DC voltage that is applied to the second parabolic signal, which is inputted to the comparator 250, is the lowest level, the comparator 250 outputs the switch control signal CS14 having the smallest pulse width.

The switch control signals CS11, CS12, CS13, and CS14 outputted from the comparators 220, 230, 240, and 250 are respectively inputted to the gates of a plurality of switches TR1, TR2, TR3, and TR4. The switches TR1, TR2, TR3, and TR4 are field effect transistors, e.g., p-type or n-type and preferably n-type, and each of the switches TR1, TR2, TR3, and TR4 is respectively connected to a transformer TN1, TN2, TN3, and TN4, which outputs a high voltage pulse, through a drain. More specifically, the switches TR1, TR2, TR3, and TR4 respectively control the operation of the transformers TN1, TN2, TN3, and TN4 in accordance with the switch control signals CS11, CS12, CS13, and CS14. For example, when a high level switch control signal CS11 is applied to the switch TR1, the switch TR1 controls the transformer TN1 so that it outputs a control pulse during a high level section or portion of the switch control signal CS11.

Figure 9:
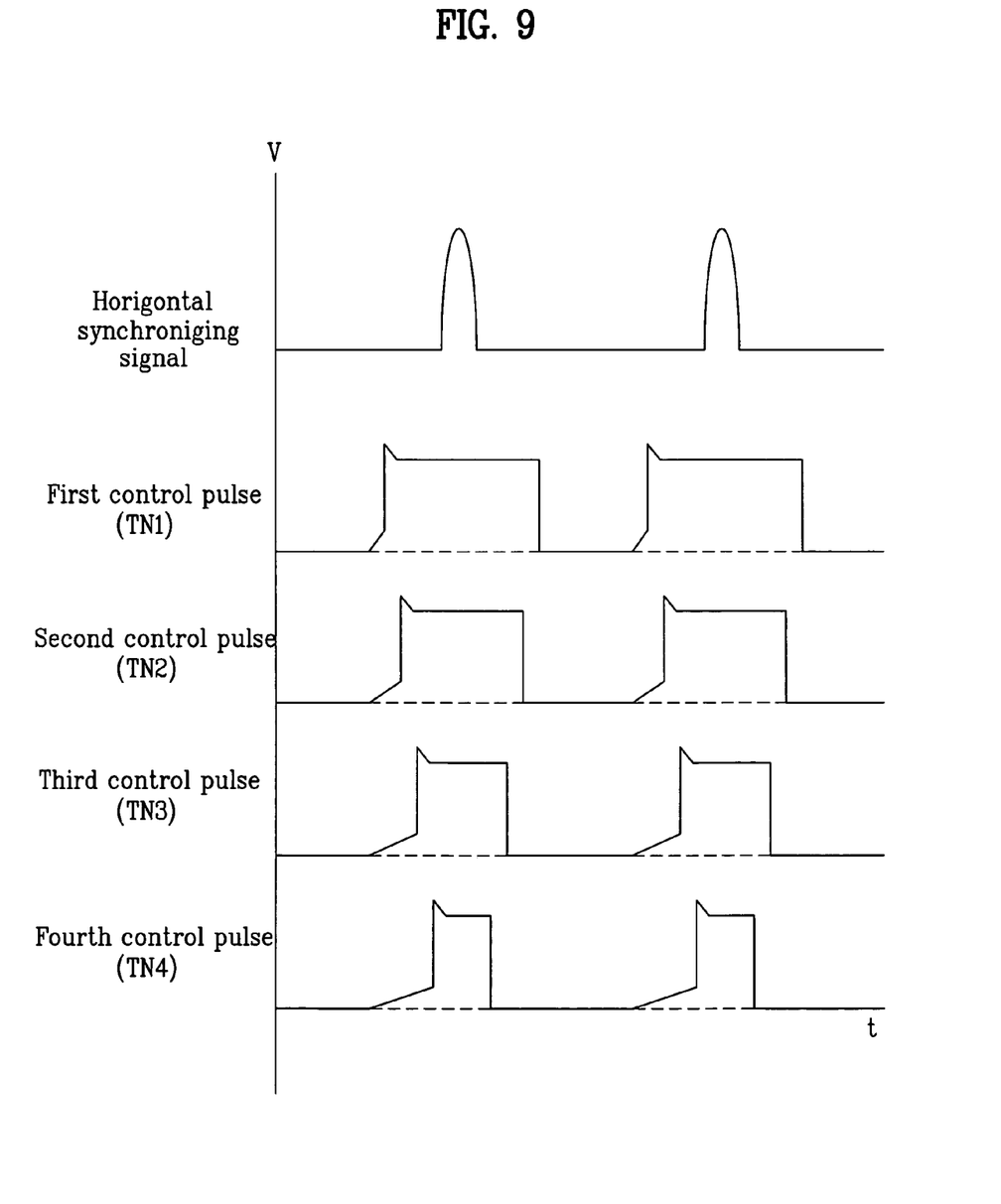
FIG. 9 illustrates high voltage pulses outputted from transformers.

Referring to FIG. 9, since a plurality of switch control signals CS11, CS12, CS13, and CS14, each having a different pulse width, is respectively inputted to the switches TR1, TR2, TR3, and TR4, the width of each of first, second, third, and fourth control pulses, which are outputted from the transformers TN1, TN2, TN3, and TN4, are also different from one another. For example, when the switch control signal CS11 having the largest pulse width is inputted to the switch TR1, the transformer TN1 outputs a control pulse having the largest width. When the switch control signal CS14 having the smallest pulse width is inputted to the switch TR4, the transformer TN4 outputs a control pulse having the smallest width.

The control pulses outputted from the transformers TR11, TR12, TR13, and TR14 are respectively inputted to a plurality of switches TR11, TR12, TR13, and TR14. The switches TR11, TR12, TR13, and TR14 are connected to a main compensation capacitor (or S-capacitor) Cs and a plurality of sub (or auxiliary) compensation capacitors C21, C23, C25, and C27. The main compensation capacitor Cs compensates the distortion of an entire picture, and each of the sub compensation capacitors C21, C23, C25 and C27 compensates the distortion occurring in specific regions of the picture.

For example, the switch TR11 is connected to the sub compensation capacitor C21 through a drain, and the sub compensation capacitor C21 is connected in parallel to the main compensation capacitor Cs. The switch TR12 is connected to the sub compensation capacitor C23 through the drain, and the switch TRI3 is connected to the sub compensation capacitor C25 through the drain. Finally, the switch TRI4 is connected to the sub compensation capacitor C27 through the drain. Each of the sub compensation capacitors C23, C25, and C27 is connected in parallel to the main compensation capacitor.

In the present invention, the sub compensation capacitors are used to prevent distortion from occurring in specific regions of the picture. For example, with reference to FIG. 4A, the sub compensation capacitor C21 compensates the distortion occurring in the center left and right regions (PA, PA') of the picture P1 along with the main compensation capacitor Cs. The sub compensation capacitor C23 compensates the distortion occurring in the subsequent center left and right portions (PB, PB') of the picture, and the sub compensation capacitor C25 compensates distortion occurring in the second subsequent center left and right portions (PC, PC') of the picture. Finally, the sub compensation capacitor C27 compensates distortion occurring in the left and right edge portions (PD, PD') of the picture.

Figure 10:
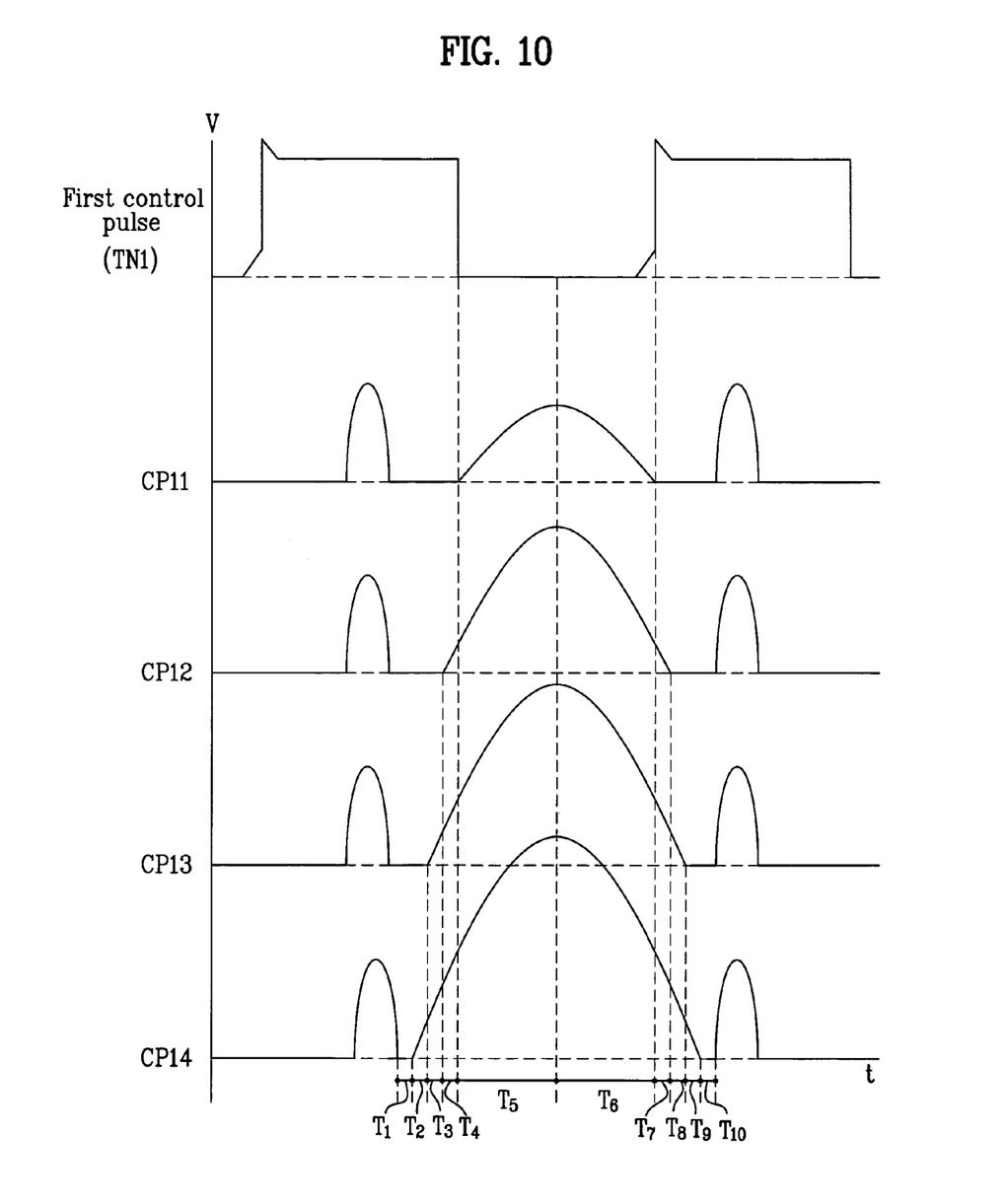
FIG. 10 illustrates signals detected from contact points (CP1, CP2, CP3, and CP4)

FIG. 10 illustrates signals detected from output terminals or nodes CP11, CP12, CP13, and CP14 of the switches TR11, TR12, TR13, and TR14. Referring to FIG. 10, when the level of the first control pulse is high, the switch TR11 is turned on. At this point, the sub compensation capacitor C21 is connected in parallel to the main compensation capacitor Cs, and the electric potential of the output terminal CP11 is minimized in sections or time periods T1 to T4. In section or time period T5, since the level of the first control pulse is low, the switch TRI1 is turned off. Hence, the electric potential of the output terminal CP11 increases. Starting from section or time period T6, the electric potential of the output terminal CP11 decreases. Starting from section or time period T7, the sub compensation capacitor C21 is connected in parallel to the main compensation capacitor Cs. Therefore, in sections or time periods T7 to TIO, the electrical potential of the output terminal CP11 is minimized again.

In sections or time periods T1 to T3, since the level of the second control pulse is high, the switch TRI2 is turned on, and the sub compensation capacitor C23 is connected in parallel to the main compensation capacitor Cs. At this point, the electric potential of the output terminal CP12 is at the minimum level. In sections or time periods T4 to T5, the level of the second control pulse is low, and therefore, the switch TRI2 is turned off, and the electric potential of the output terminal CP12 increases. Starting from section or time period T6, the electric potential of the output terminal CP12 begins to decrease, and starting from section or time period T8, the sub compensation capacitor C23 is connected in parallel to the main compensation capacitor Cs. Therefore, in sections or time periods T8 to T10, the electrical potential of the output terminal CP12 is minimized once again.

In sections or time periods T1 to T2, since the level of the third control pulse is high, the switch TR13 is turned on, and the sub compensation capacitor C25 is connected in parallel to the main compensation capacitor Cs. In sections or time periods T3 to T5, the level of the third control pulse is low, and therefore, the switch TRI3 is turned off, and the electric potential of the output terminal CP13 increases. Starting from section or time period T6, the electric potential of the output terminal CP13 begins to decrease, and upon reaching section or time period T9, the sub compensation capacitor C25 is connected in parallel to the main compensation capacitor Cs. Accordingly, in sections or time periods T9 to T10, the electrical potential of the output terminal CP13 is minimized again.

In section or time period T1, since the level of the fourth control pulse is high, the switch TRI4 is turned on, and the sub compensation capacitor C27 is connected in parallel to the main compensation capacitor Cs. In sections or time periods T2 to T5, the level of the fourth control pulse is low, and the switch TRI4 is turned off, and the electric potential of the output terminal CP14 increases. Starting from section or time period T6, the electric potential of the output terminal CP14 begins to decrease, and starting from section or time period T10, the sub compensation capacitor C27 is connected in parallel to the main compensation capacitor Cs. Therefore, in section T10, the electrical potential of the output terminal CP14 is minimized once again.

Furthermore, in section or time period T1, when all of the switches TR11, TRI2, TRI3, and TR14 are turned on, the sub compensation capacitors C21, C23, C25, and C27 are connected to one another in parallel, and each of the sub compensation capacitors C21, C23, C25, and C27 is then connected in parallel to the main compensation capacitor. In sections or time periods T5 to T6, when all of the switches TR11, TR12, TR13, and TRI4 are turned off, the sub compensation capacitors C21, C23, C25, and C27 are not connected to one another in parallel, and the sub compensation capacitors C21, C23, C25, and C27 are not connected in parallel to the main compensation capacitor.

The present invention is advantageous in that by using a plurality of different switches, each having a different turn-on time, so as to control the association (or link or connection, or confirmation or path) between a main compensation capacitor (or S-capacitor) and a plurality of sub compensation capacitors, which compensate distortion occurring in specific regions of the picture, a linear distortion and an internal pin distortion can be compensated. Therefore, an ultra-slim CRT display device can be provided.

The present invention is not limited to the above-described structure. And, accordingly, the number of comparators and switches and the association (or link or connection or configuration or path) between the main compensation capacitor and the sub compensation capacitors may vary differently. Also, the present invention may be used in other types of display device, wherein picture distortion may occur, and is not limited to the braun tubes used in television receivers or monitors only.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A bias circuit for a display device to prevent and/or compensate a picture distortion, comprising:
    a controller that generates a plurality of control signals and each of the plurality of first control signals having a different duty cycle, and includes a plurality of comparators to output the plurality of first control signals, each comparator having a first input and a second input, wherein the first inputs of the plurality of comparators receive a same first signal and each of the second inputs of the plurality of comparators receives a second signal, and wherein the second signal input into each comparator has a different DC component which determines the duty cycle of a respective one of the first control signals; and a compensation circuit having a plurality of first switches, at least one main capacitor and a plurality of sub capacitors, a corresponding first switch provided between the main capacitor and a corresponding sub capacitor, wherein the plurality of first switches determine at least one of whether the main capacitor is coupled to the plurality of sub capacitors or whether the plurality of sub capacitors are coupled to each other, based on the plurality of first control signals.

2. The bias circuit of claim 1, wherein the coupling determines at least one of a charging path or a discharging path of the main capacitor and the plurality of sub capacitors.

3. The bias circuit of claim 2, wherein the compensation circuit further comprises:
   a plurality of second switches, each receiving a corresponding first control signal;
   a plurality of transformers, each coupled to a corresponding second switch and outputting a corresponding second control signal, which is based on a corresponding first control signal such that each second control signal has a different duty cycle, to a corresponding first switch; and
   a plurality of diodes, each diode coupled in parallel to a corresponding transformer and coupled to a corresponding first switch.

4. The bias circuit of claim 3, wherein the first and second switches are field effect transistors.

5. The bias circuit of claim 1, wherein the same first signal is a first parabolic signal generated a parabolic generator.

6. The bias circuit of claim 1, wherein the same first signal is a saw tooth waveform signal generated by a saw tooth waveform generator.

7. The bias circuit of claim 1, wherein the same first signal is synchronized with a horizontal synchronization signal.

8. The bias circuit of claim 1, wherein each of the second signals is generated based on a second parabolic signal provided through a capacitor coupled in series to a resistor and a variable resistor coupled to a prescribed DC voltage.

9. The bias circuit of claim 8, wherein the second parabolic signal is provided through a photo coupler having an LED and a photo-transistor.

10. The bias circuit of claim 8, wherein the second parabolic signal is synchronized with a vertical synchronization signal.

11. The bias circuit of claim 8, wherein the prescribed DC voltage is provided by a power circuit, a prescribed voltage source or a rectifying circuit.

12. The bias circuit of claim 11, wherein the rectifying circuit comprises:
   a horizontal pulse transformer receiving a horizontal synchronization signal;
   a diode coupled to an output of the horizontal pulse transformer; and
   a capacitor coupled to the diode, wherein a node between the diode and the capacitor is used for providing the DC voltage.

13. The bias circuit of claim 1, wherein the corresponding first control signal is provided directly to a corresponding first switch.

14. A bias circuit for a display device, comprising:
   a controller that generates a plurality of first control signals and each of the plurality of first control signals having a different duty cycle, and includes a plurality of comparators to output the plurality of first control signals, each comparator having a first input and a second input, wherein the first inputs of the plurality of comparators receive a same first signal and each of the second inputs of the plurality of comparators receives a second signal, wherein the second signal input into each comparator has a different DC component which determines the duty cycle of a respective one of the first control signals; and
   a compensation circuit responsive to the plurality of control signals, wherein a duty cycle of a corresponding first control signal determines which portion of a picture is compensated for distortion, and comprises a plurality of first switches, at least one main capacitor and a plurality of sub-capacitors, a corresponding first switch provided between the main capacitor and a corresponding sub-capacitor, wherein the plurality of first switches determines at least one of whether the main capacitor is coupled to the plurality of sub-capacitors or whether the plurality of sub-capacitors are coupled to each other, based on the plurality of first control signals, and includes a plurality of comparators to output the plurality of first control signals.

15. The bias circuit of claim 14, wherein the coupling determines at least one of a charging path or a discharging path of the main capacitor and the plurality of sub capacitors.

16. The bias circuit of claim 15, wherein the compensation circuit further comprises:
   a plurality of second switches, each receiving a corresponding first control signal;
   a plurality of transformers, each coupled to a corresponding second switch and outputting a corresponding second control signal, which is based on a corresponding first control signal such that each second control signal has a different duty cycle, to a corresponding first switch; and
   a plurality of diodes, each diode coupled in parallel to a corresponding transformer and coupled to a corresponding first switch.

17. The bias circuit of claim 16, wherein the first and second switches are field effect transistors.

18. The bias circuit of claim 14, wherein the same first signal is a first parabolic signal generated a parabolic generator.

19. The bias circuit of claim 14, wherein the same first signal is a saw tooth waveform signal generated by a saw tooth waveform generator.

20. The bias circuit of claim 14, wherein the same first signal is synchronized with a horizontal synchronization signal.

21. The bias circuit of claim 14, wherein each of the second signals is generated based on a second parabolic signal provided through a capacitor coupled in series to a resistor and a variable resistor coupled to a prescribed DC voltage.

22. The bias circuit of claim 21, wherein the second parabolic signal is provided through a photo coupler having an LED and a photo-transistor.

23. The bias circuit of claim 21, wherein the second parabolic signal is synchronized with a vertical synchronization signal.

24. The bias circuit of claim 21, wherein the prescribed DC voltage is provided by a power circuit, a prescribed voltage source or a rectifying circuit.

25. The bias circuit of claim 24, wherein the rectifying circuit comprises:
- a horizontal pulse transformer receiving a horizontal synchronization signal;
- a diode coupled to an output of the horizontal pulse transformer; and
- a capacitor coupled to the diode, wherein a node between the diode and the capacitor is used for providing the DC voltage.

26. The bias circuit of claim hi 14, wherein the corresponding first control signal is provided directly to a corresponding first switch.

27. A method of driving a bias circuit, comprising:
- generating switch control signals each having a different duty cycle, wherein the switch control signals are generated with different duty cycles by generating a first parabolic signal that is synchronized with a horizontal synchronizing signal, generating second parabolic signals each having a DC voltage of a different voltage level applied thereto, and generating the switch control signals each having a different duty cycle in accordance with the first and second parabolic signals;
- providing the switch control signal to a plurality of switches; and
- providing a combined capacitance value of a main capacitor and a plurality of sub capacitors, which are connected to each switch, in accordance with the switch control signals.

28. The method of claim 27, wherein the adjusting an added capacitance value of a main capacitor and a plurality of sub capacitors comprises:
- when the switch control signal being transmitted to the switch is at a high level, connecting in parallel the corresponding sub capacitors, and connecting in parallel the sub capacitors that are connected in parallel to the main capacitor.

* * * * *